United States Patent [19]

Tokas

[11] 4,252,764
[45] Feb. 24, 1981

[54] PROCESS FOR PREPARING MOLDING COMPOSITIONS

[75] Inventor: Edward F. Tokas, W. Hatfield, Mass.

[73] Assignee: Monsanto Company, St. Louis, Mo.

[21] Appl. No.: 33,287

[22] Filed: Apr. 25, 1979

Related U.S. Application Data

[62] Division of Ser. No. 951,493, Oct. 16, 1978, Pat. No. 4,180,486.

[51] Int. Cl.$^3$ ............................................. B28B 11/16
[52] U.S. Cl. .................................... 264/142; 264/169; 264/211
[58] Field of Search ............... 264/211, 169, 147, 142; 528/481, 489; 526/1; 260/4 AR

[56] References Cited

U.S. PATENT DOCUMENTS

| | | | |
|---|---|---|---|
| 2,382,803 | 8/1945 | Miller et al. | 260/464 |
| 3,172,879 | 3/1965 | Feustanding et al. | 260/88.7 |
| 3,372,215 | 3/1968 | Mairhead et al. | 264/142 |
| 3,635,883 | 1/1972 | Stamid | 260/15.75 K |
| 3,998,797 | 12/1976 | Brandi et al. | 526/487 |
| 4,122,135 | 10/1978 | Valoti et al. | 264/142 |

FOREIGN PATENT DOCUMENTS 48-20216  6/1973  Japan ...................................... 264/211

OTHER PUBLICATIONS

"Chemistry of Acrylonitrile" America Cyanamid Co. 1959, pp. 1x, 13, 14, 69, 75, 77 and 78.

*Primary Examiner*—Jay H. Woo
*Attorney, Agent, or Firm*—Michael J. Murphy

[57] ABSTRACT

Improved molding compositions and a dry blend process for preparing same, such compositions being especially adapted for fabrication into packaging materials and comprising an intimate blend of a styrene polymer and myrcene compound.

4 Claims, No Drawings

PROCESS FOR PREPARING MOLDING COMPOSITIONS

This is a division of application Ser. No. 951,493, filed Oct. 16, 1978 now U.S. Pat. No. 4,180,486.

CROSS REFERENCE TO RELATED APPLICATIONS

1. Chemically Reducing Residual Acrylonitrile Monomer In Nitrile Polymers And Shaped Packaging Materials Formed Thereby, E. F. Tokas, U.S. Ser. No. 943,565, filed Sept. 18, 1978.

2. Chemically Reducing Residual Styrene Monomer In Styrene Polymers And Shaped Products Formed Therefrom, E. F. Tokas, U.S. Ser. No. 951,513, filed Oct. 16, 1978.

BACKGROUND OF THE INVENTION

This invention relates to molding compositions and more particularly to improved compositions and a process for preparing same wherein such compositions are especially adapted for shaping into products such as packaging materials wherein free styrene(S) monomer therein is reduced.

Thermoplastic polymer compositions containing polymerized S can be shaped into a wide variety of useful articles by conventional techniques such as casting, extrusion, milling, molding, drawing, blowing, etc. Applications for such shaped articles are widespread and include structural units where properties such as low thermal deformation, impact resistance (when a rubber component is present) and high gloss are required. When acrylonitrile is present with styrene in a copolymer at a concentration of at least about 50 weight percent, the compositions uniquely exhibit excellent solvent resistance and low permeability to liquids and gases which make them especially useful as a lightweight substitute for glass in packaging and particularly in the manufacture of bottles, film, sheet, tubs, cups, trays and other containers for liquids and solids.

In manufacturing such polymer compositions, it is well known that free, unconverted S monomer remains absorbed within the polymer particles when polymerization is not 100% complete and which is therefore present in products formed therefrom. Recently government regulatory agencies are moving toward establishing maximum permissible levels of various monomers in the environment on grounds that excess levels may constitute a health hazard, and particularly regulations have been applied to packaging materials intended for contact with environmentally sensitive products such as food, beverages, pharmaceuticals, cosmetics and the like for which application styrenic copolymers are especially suited.

Even though possible to reduce residual styrene monomer (RST) in styrenic polymers before melt processing via stripping, it has been discovered that free S monomer is thermally regenerated due to polymer unzipping during melting at standard melt processing times and temperatures. Depending on the level of S present in the polymer before melting, such an increase could be sufficient to (i) be extractable from shaped packaging materials in contact with food simulating solvents and/or (ii) be released into the atmosphere around melt processing equipment. Accordingly, reduction of S monomer in the raw polymer could be ineffectual in controlling S in shaped products formed in an operation involving melt processing.

SUMMARY OF THE INVENTION

Now, however, improvements have been developed to minimize such prior art shortcomings.

Accordingly, a principal object of this invention is to provide polymer molding compositions containing polymerized styrene which minimize generation of free S monomer during conversion to melt form.

Another object is to provide in a polymerized-styrene-containing molding composition, a chemical scavenger for or regulator of S monomer which is effective at relatively low levels of S monomer to minimize generation of the latter during melt processing of such composition.

A further object is to provide such a molding composition and a process for preparing same which contains a scavenger at low concentrations which is compatible with the base polymer to avoid the need of excess amounts which could cause deterioration of properties in the shaped product such as optical (e.g. color and haze) and taste properties which are important in packaging environmentally sensitive materials.

A specific object is to provide a molding composition containing a scavenger which not only regulates the level of RST in the base styrenic polymer but also regulates the level of free acrylonitrile monomer when polymerized acrylonitrile is present as a constituent of the styrenic polymer.

Other objects of this invention will in part be obvious and will in part appear from the following description and claims.

These and other objects are accomplished by providing a molding composition comprising a blend of a styrenic polymer containing at least about 10 weight percent based on total polymer weight of polymerized styrene and about 0.005 to 2 weight percent based on the weight of the polymer of a myrcene compound.

From a process standpoint, there is provided a process for preparing an extruded, pelleted molding composition which comprises dry blending a styrenic polymer containing free styrene monomer with about 0.005 to about 2 percent by weight of myrcene based on the weight of the styrenic polymer, wherein the styrenic polymer comprises at least about 10 percent by weight of polymerized styrene, melting and extruding the resulting blend and then pelletizing the extrudate.

PREFERRED EMBODIMENTS

Styrenic polymers useful in the molding compositions of the present invention generate free S monomer during melting and may constitute either a styrene homopolymer or a copolymer containing at least about 10 percent by weight of polymerized S together with one or more copolymerized comonomers. Such comonomers include:

(a) monovinylidene aromatic hydrocarbon monomers other than styrene of the formula:

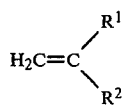

wherein $R^1$ is hydrogen, chlorine or methyl and $R^2$ is an aryl group of 6 to 10 carbon atoms and may also contain substituents such as halogen as well as alkyl groups attached to the aromatic nucleus, e.g., alpha methylstyrene, vinyl toluene, alpha chlorostyrene, ortho chlorostyrene, meta chlorostyrene, para chlorostyrene, ortho methylstyrene, para methylstyrene, ethyl styrene, isopropyl styrene, dichloro styrene, vinyl naphthalene, etc.

(b) lower alpha olefins of from 2 to 8 carbon atoms, e.g., ethylene, propylene, isobutylene, butene-1, pentene-1 and their halogen and aliphatic substituted derivatives, e.g., vinyl chloride, vinylidene chloride, etc.

(c) acrylic acid and methacrylic acid and the corresponding acrylate and methacrylate alkyl esters where the alkyl group contains from 1 to 4 carbon atoms, e.g., methyl acrylate, ethyl acrylate, propyl acrylate, methyl methacrylate, etc.

(d) vinyl esters of the formula:

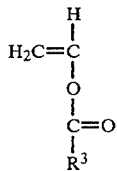

wherein $R^3$ is hydrogen, an alkyl group of from 1 to 10 carbon atoms, an aryl group of 6 to 10 carbon atoms, e.g., vinyl formate, vinyl acetate, vinyl propionate, vinyl benzoate, etc.

(e) vinyl ether monomers of the formula:

wherein $R^4$ is an alkyl group of from 1 to 8 carbon atoms, an aryl group of from 6 to 10 carbon atoms or a monovalent aliphatic radical of from 2 to 10 carbon atoms, which aliphatic radical may be hydrocarbons or oxygen-containing, i.e., an aliphatic radical with ether linkages and may also contain other substituents such as halogen, carbonyl, etc. Examples of these monomeric vinyl ethers include vinyl methyl ether, vinyl ethyl ether, vinyl n-butyl ether, vinyl 2-chloroethyl ether, vinyl phenyl ether, vinyl cyclohexyl ether, 4-butyl cyclohexyl ether, and vinyl p-chlorophenylene glycol ether, etc.

(f) olefinically unsaturated mononitriles having the formula:

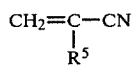

wherein $R^5$ is hydrogen, an alkyl group having 1 to 4 carbon atoms or a halogen. Such compounds include acrylonitrile, methacrylonitrile, ethacrylonitrile, propioacrylonitrile, alpha chloroacrylonitrile, etc.

Additional comonomers useful in the practice of this invention are those containing a mono-or di-nitrile function. Examples of these include methylene glutaronitrile, 2, 4-dicyanobutene-1, vinylidene cyanide, crotonitrile, fumaronitrile, maleonitrile.

Preferred comonomers are the olefinically unsaturated mononitriles, monovinylidene aromatic hydrocarbons, lower alpha olefins, acrylic and methacrylic acid and the corresponding acrylate and methacrylate esters, with the olefinically unsaturated mononitrile hydrocarbons being more particularly preferred. Most specifically preferred is acrylonitrile and alpha methylstyrene.

The amount of comonomer as defined above present in the styrenic compositions can vary up to about 90% by weight based on the total weight of the styrenic polymer composition. Preferred styrenic compositions for packaging applications requiring excellent oxygen and water vapor barrier properties in the packaging materials contain from about 10 to about 50% by weight of polymerized styrene monomer and from about 90 to about 50% by weight of polymerized acrylonitrile comonomer and more preferably from about 15 to about 45% by weight of styrene monomer and from about 85 to about 55% by weight of acrylonitrile monomer, all based on total polymer weight.

Styrenic polymers within the scope of the molding compositions of this invention may also contain an elastomer in the form of a synthetic or natural rubber component such as polybutadiene, isoprene, neoprene, nitrile rubbers, natural rubbers, acrylonitrile-butadiene copolymers, ethylenepropylene copolymers, chlorinated rubbers, etc., which are used to strengthen or toughen products such as shaped packaging materials. This rubber component may be incorporated into the styrene polymer composition by any of the methods well known to those skilled in the art, e.g., direct polymerization of monomers, polyblends, grafting the styreneacrylonitrile monomer mixture onto the rubbery backbone, etc. Especially preferred are polyblends divided by mixing a graft copolymer of acrylonitrile and comonomer on the rubbery backbone with another copolymer of acrylonitrile and the same comonomer. Generally, such rubber component may comprise from 0 to about 25% and preferably up to about 10% by weight of the nitrile polymer composition.

The active ingredient in the molding compositions of the invention for reducing the free S monomer content of the styrenic polymer is myrcene having the formula 3 methylene-7-methyl-1, 6 octadiene. Myrcene is a terpene hydrocarbon which has U.S. Food and Drug Administration (FDA) approval as a food additive. It has the form of a colorless liquid at room temperature having a boiling point of 67° C. and a balsomic resinous odor. In place of pure natural myrcene which occurs as a constituent of bay oil and other essential oils, or pure synthetic myrcene, it is possible to employ materials rich in myrcene. For example, the pyrolysis of beta pinene yields mixtures containing as much as 77 wt.% myrcene in conjunction with minor quantities of limonene and other complex terpenes.

The amount of myrcene in the molding compositions of the present invention is sufficient to minimize free residual styrene monomer (RST) in the styrenic polymer after melting, and in instances where the polymer end use is for packaging environmentally sensitive substances such as food, pharmaceuticals, margarine, butter and the like, should not be sufficient to impart a myrcene-related taste to any such packaged substances. Allowance should be made for vaporization of some of the admixed myrcene during melting of the styrene polymer molding compositions. In general the regulating amount of myrcene required to minimize RST will be in the range of from about 0.005 to about 2.0 percent by weight based on the weight of the styrene polymer. In most applications the amount of myrcene will be in the range of from 0.01 to about 1.5 percent by weight. When using a compound which yields myrcene or else contains or behaves as a myrcene donor, the amount of such myrcene compound is calculated so as to provide an amount of myrcene within the preceding ranges.

As stated, the improved molding compositions of the invention comprise an intimate blend of styrenic polymer and myrcene compound. The intimate mixture of myrcene and styrene polymer may be obtained by combining the myrcene with the styrene polymr by adding the myrcene compound to the polymerization system during preparation of the styrenic polymer. Alternatively, the myrcene compound can be combined with the styrenic polymer after polymerization, as for example, by adding it to the styrenic polymer in the polymer recovery steps such as during coagulation, stripping, washing, drying, etc., or by steeping the polymer in the presence of the liquid myrcene compound. Another method is to dry blend the styrenic polymer and myrcene prior to a melting step used in compounding or shaping the polymer. In still another method the myrcene and styrenic polymer are dispersed in a liquid medium followed by evaporation of the liquid medium. In still another method, the myrcene is injected into the molten polymer during the melting operation. Other methods of forming the intimate mixture will become apparent to those skilled in the art upon reading the present specification.

In general, the preferred method of admixing the styrenic polymer and myrcene is blending the styrenic polymer in dry form with the myrcene.

The forming operations used to prepare products from the molding compositions of this invention such as the preferred polymeric packaging materials, e.g., film, sheet, tubs, trays, containers such as bottles, cans, jars, etc., preforms for forming same and the like, are carried out by shaping the molding compositions by procedures known in the art. In this connection, conventional plasticators can be used utilizing a screw rotating within a plasticizing zone to masticate the polymer wherein the screw is either aixially fixed or reciprocable, the latter occurring for example in an injection molding system. The forming operations include both a melting step wherein the polymer is converted from solid to melt form by physical working at temperatures in the range of from about 170° to about 262° C. and any subsequent shaping step performed on the melt. The melting and shaping steps may occur sequentially or substantially simultaneously. Examples of forming operations used to prepare shaped polymeric packaging materials include pelletizing, extrusion, blow molding, injection molding, compression molding, mill rolling, vacuum forming, plug assist thermoforming from sheet material, combinations of the foregoing and the like.

More than one forming operation wherein the styrenic polymer composition is heated and shaped may be involved in certain instances. This can occur, for example, in the case of a polymer which is heated through working to a melted state, extruded and pelletized and then the pellets are processed again such as by heating for melting and shaping into a finished end product such as a sheet or into an intermediate sheet or tubular parison which is then reshaped into a container such as a shallow tub or bottle. In such situations, the present invention contemplates having the myrcene in contact with the styrenic resin during at least one of the forming operations wherein the polymer is heated to the point where it melts and then is shaped. Preferably when more than one heating step is involved, the myrcene compound is intimately mixed with the styrenic polymer before or during the first step wherein the polymer is heated to the point where it melts.

The actual measurement of the amount of RST in products formed of styrenic polymers is not considered part of this invention. In this regard any method capable of detecting S monomer (and acrylonitrile monomer where pertinent) to about 1 ppm can be used. Such methods, which are known to those in the art, include colorometric, polarographic, gas chromatographic, fluorometric and electrochemical measurements with gas chromatographic being preferred. Methods for measuring RAN are publicly available from the U.S. Food and Drug Administration and are described in and a part of Food and Drug Administration Regulation No. 121.2629 which is referenced in Vol. 40, No. 30 of The Federal Register.

The present invention also contemplates the use of other additives and ingredients in the polymeric compositions which do not adversely affect the properties of the resulting molded products such as taste when such products are packaging materials intended for food contact use. Examples of these ingredients include thermal stabilizers, light stabilizers, dyes, pigments, plasticizers, fillers, antioxidants, lubricants, extrusion aids, scavenger(s) for monomers other than styrene, etc.

The following examples are set forth in illustration of the invention and should not be construed as limitations thereof. All parts and percentages are by weight unless otherwise specified. Wherever convenient, residual styrene is abbreviated as RST. The amount of myrcene compound is based on the weight of the styrenic polymer. A dash in a Table means that particular product was not tested.

EXAMPLES 1 AND 2

A styrenic copolymer in bead form containing 32% polymerized styrene and 68% polymerized acrylonitrile prepared by conventional aqueous polymerization methods was dry blended with various scavenging amount of myrcene. Blending to insure intimate admixture of the polymer and myrcene was carried out by placing the quantities of each in a polyethylene bag and shaking vigorously for 2 minutes. The styrenic polymer blends were converted from solid to melt form by physically working the polymer in multiple pass extrusion with a conventional plasticator in the form of a one inch extruder having a 16:1 L/D ratio fitted with a rotary two stage screw operating at 70 r.p.m. Extrudate strands issuing from the die were cut into pellet form. Zone temperatures of the extruder were set to provide a melt stock temperature of approximately 218° C. After each pass, samples were analyzed for RSt content with the results of these tests tabulated in Table I below.

TABLE I

| | | SUMMARY OF EXAMPLES 1 AND 2 | | | |
|---|---|---|---|---|---|
| | Percent | | ppm RST | | |
| Ex. | Myrcene | Polymer Beads | 1 Pass | 2 Passes | 3 Passes |
| 1 | 0.0 | 7.0 | 24.0 | 27.5 | 30.0 |
| 2 | 0.97 | 7.0 | 16.0 | — | 21.5 |

Control Example 1 illustrates that without myrcene the level of RST in the polymer during melt processing increases about three to four fold depending on the number of extrusion passes, vis-a-vis the initial RAN level in the polymer. Example 2 illustrates that the use of a small scavenging amount of myrcene effectively suppresses and regulates the amount of RST in the polymer at significantly lower levels than the control at very dilute concentrations of the additive and the ST in the polymer

EXAMPLES 3 TO 5

The following Examples 3 to 5 illustrate the present invention in providing shaped, e.g., molded, products with regulated RST content which are intended for packaging environmentally sensitive substances.

In these Examples 3 to 5, the styrenic polymer initially in pellet form is one which is modified for impact resistance (impact polystyrene) and comprises a polyblend of polystyrene and about 8 percent (based on polystyrene weight) of a dispersed rubber phase comprising a rubber grafted with polymerized styrene wherein the rubber is dispersed as particles having a size between about 1 to 20 microns and which contain about 1 to 5 parts of grafted and occluded polystyrene per part of rubber. Such pellets were combined with liquid myrcene and blended in a tumbler for one hour. In Example 4, the admixture was converted to melt form and injection molded directly into flat rectangular chips 3 inches (7.6 cm.)×4 inches (10 cm.)×100 mils thick on a laboratory size Arburg rotating-reciprocating screw injection molding machine operating at 800–1000 psi back pressure with a stock temperature of about 232° C. In Example 5, the admixture of polymer and myrcene was first melt blended via a rotating screw-plasticator and shaped into pellets by cutting the strand extrudate with such pellets then being remelted and injection molded into such chips. Five gram samples from the chips were dissolved in dimethyl formamide and tested for RST. The results of these tests are tabulated in Table II below.

TABLE II
SUMMARY OF EXAMPLES 3 TO 5

| Ex. | % Myrcene | ppm RST Pellet | ppm RST Molded Chip | RST Increase (ppm) | RST Increase (%) |
|---|---|---|---|---|---|
| 3 | 0.0 | 826 | 1001 | +175 | 21.2 |
| 4 | 0.5 | 836 | 955 | +119 | 14.2 |
| 5 | 0.5 | 845* | 897 | + 52 | 6.2 |

*After first melt blending.

The above data illustrates that myrcene reduces the level of RST in shaped products formed from styrenic resins according to the invention over that present (Ex. 1) when no myrcene at all is used. The RST level in the pellets of Example 5 is higher than that of Example 4 because of the heat history associated with the melting step in obtaining the pellets of Example 5 which was not present in Example 4. The RST level in the molded chips of Example 5 is lower than that of Example 4 because of the better dispersion of the myrcene in the polymer achieved in remelting the previously melt blended pellets during molding of the chips of Example 5.

To the best of applicant's knowledge, fabrication of other forms of shaped materials such as those used in packaging environmentally sensitive substances, for example, film or sheet material useful as overwrappings, tubs or cup-like containers for holding margarine, butter and similar based food products, as well as trays for meats, poultry, etc., should give similar results to those of Examples 4 and 5 in terms of minimizing RST buildup for comparable levels of polymerized styrene in the starting resin.

EXAMPLES 6 TO 9

The following Examples 6 to 9 illustrate a feature of the invention in the use of myrcene in controlling free, residual acrylonitrile monomer (RAN) in styrenic polymers containing polymerized acrylonitrile as well as polymerized styrene. The polymer composition is identical to those of Example 1, 2 with extrusion conditions being somewhat higher at about 254° C. The results of these tests are tabulated in Table III below.

TABLE III
SUMMARY OF EXAMPLES 6 TO 9

| Ex. | Percent Myrcene | ppm RAN Polymer Beads | 1 Pass | 2 Passes | 3 Passes |
|---|---|---|---|---|---|
| 6 | 0.0 | 0.7 | 7.0 | 9.9 | 11.7 |
| 7 | 0.97 | 0.7 | 2.5 | 2.6 | 3.0 |
| 8 | 0.14 | 0.7 | 6.0 | 8.0 | 7.1 |
| 9 | 0.03 | 0.7 | 7.3 | — | 9.9 |

Control Example 6 illustrates that without myrcene the level of RAN in the polymer during melt processing increases about ten to sixteen fold depending on the number of extrusion passes, vis-a-vis the initial RAN level in the polymer. Examples 7 to 9 illustrate that the use of small scavenging amounts of myrcene, (e.g. between about 0.005 to 2.0 percent) effectively suppresses and regulates the amount of RAN in the polymer at significantly lower levels than the control at very dilute concentrations of myrcene and AN monomer in the polymer.

As an aid in reducing problems associated with feeding the polymer-myrcene mixture to the rotating screw plasticator, about 1 to 15 percent (based on the weight of the styrenic polymer) of an anti-slip agent in the form of a coagulated and dried rubber crumb latex may be mixed with the polymermyrcene mixture before charging the extruder. A rubber crumb successfully so used comprises by weight: butadiene 30–34%; styrene 38–42%; acrylonitrile 16–20%; methyl methacrylate 8–10% and ethylene glycol dimethyl stearate 0.5–1%.

EXAMPLES 10 TO 14

An an extension of Examples 6 to 9, the following Examples 10 to 14 illustrate the invention in providing products shaped from styrenic polymers containing polymerized acrylonitrile with low RAN content which are intended for packaging environmentally sensitive substances. Styrene polymer of the type used in Examples 1, 2 is dry blended with 1 percent myrcene compound mixed with the rubber crumb mentioned in connection with Examples 6 through 9 and then injection molded in a commercial size injection molding machine at temperatures in the range of from 230° to 270° C. into hollow, tubular preforms of circular cross section, closed at one end and having a molded finished at the other end. Such preforms are further described in U.S. Pat. No. 3,900,120, col. 5, lines 13–42, the content of which is incorporated herein by reference. The polymer of the walls of such preforms and bottles is considered to contain the reaction product of a.) and AN and ST chemical scavenger, i.e., myrcene and b.) both AN and ST monomer. After cooling to room temperature, performs formed as just described were analyzed for RAN content while others formed in such manner were reheated to molecular orientation blowing temperature of about 132° to 138° C. and then distended in a conventional blow mold into 32 ounce (950 cc.) self-supporting bottles intended for packaging beverages and the like. The level of RAN in the bottles was then determined. Optical quality of the bottles was also visually noted. The results of these tests are tabulated in Table IV below.

TABLE IV

SUMMARY OF EXAMPLES 10 TO 14

| Ex. | Wt. % Myrcene | RAN (ppm) Preform | RAN (ppm) Bottle | Bottle Optical Quality* |
|---|---|---|---|---|
| 10 | 0.0 | 9.1 | 8.3 | A |
| 11 | 1.0 | — | 1.9 | A |
| 12 | 1.0 | 2.9 | 3.9 | A |
| 13 | 1.0 | 3.7 | 3.6 | A |
| 14 | 1.0 | 5.3 | 3.4 | A |

*A = Control

The above data illustrates the efficiency of myrcene in reducing the amount of RAN in the walls of preforms and containers formed of styrenic results containing polymerized acrylonitrile as a comonomer, in some cases to less than 3 ppm in such preforms and bottles. As indicated, the additional minimal heat history experienced by the preforms in reheating to bottle blowing temperatures did not significantly affect RAN level, and in all examples bottle optical quality was equal to that of the control.

The preceding description is set forth for purposes of illustration only and is not to be taken in a limited sense. Various modifications and alternations will be readily suggested to persons skilled in the art. It is intended, therefore, that the foregoing be considered as examplary only and that the scope of the invention be ascertained from the following claims.

What claimed is:

1. A process for preparing an extruded, pelleted molding composition for use in environmentally sensitive packaging applications which comprises:
   (a) dry blending a styrenic polymer containing free styrene monomer with about 0.005 to about 2 percent by weight of myrcene based on the weight of the styrenic polymer, wherein the styrenic polymer comprises at least about 10 percent by weight of polymerized styrene;
   (b) melting and extruding the resulting blend; and then
   (c) pelletizing the extrudate.

2. The process of claim 1 wherein the styrenic polymer comprises about 10 to about 50 percent by weight of polymerized styrene and about 90 to about 50 percent by weight polymerized acrylonitrile.

3. The process of claim 1 wherein the styrenic polymer comprises at least about 50 percent by weight of polymerized acrylonitrile.

4. The process of claims 1, 2 or 3 wherein the styrenic polymer further contains about 0 to 25 percent by weight of a synthetic or natural rubber component.

* * * * *